United States Patent
Goeckler

(12) 
(10) Patent No.: US 6,304,301 B1
(45) Date of Patent: Oct. 16, 2001

(54) METHOD FOR PREPARING A BAND PASS SIGNAL

(75) Inventor: Heinz Goeckler, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/013,528

(22) Filed: Jan. 26, 1998

(30) Foreign Application Priority Data

Jan. 29, 1997 (DE) .............................. 197 03 079

(51) Int. Cl.⁷ ..................................................... H04N 7/00
(52) U.S. Cl. ........................... 348/723; 348/725; 348/572
(58) Field of Search ................. ; 348/735, 723, 348/724, 725, 726, 572, 487, 469; H04N 7/00, 5/44, 5/38, 5/445, 5/40

(56) References Cited

FOREIGN PATENT DOCUMENTS

| 40 26 477 A1 | 3/1992 | (DE) . | |
| 4136111 | * 5/1993 | (DE) | ................................ H04N/7/00 |
| 43 37 134 A1 | 5/1995 | (DE) . | |

* cited by examiner

*Primary Examiner*—David E. Harvey
(74) *Attorney, Agent, or Firm*—Michael J. Striker

(57) ABSTRACT

A method for preparing an intermediate position delivered analog band pass signals includes the steps of sampling analog/digital conversion, frequency shift, and digital filtering. To advantageously ensure an efficient processing of frequency signals of different transmission norms, certain conditions for the sampling frequency and the utility spectral portion are preferably specified.

15 Claims, 2 Drawing Sheets

METHOD FOR PREPARING A BAND PASS SIGNAL

BACKGROUND OF THE INVENTION

The present invention relates to a method for preparing a band pass signal and, in particular, to a method for preparing an analog band pass signal received from an intermediate frequency position for various transmission conditions.

German patent document DE 40 26 477 A1 discloses a method for forming a frequency multiplex signal (FDM) with digital signal processing, such as an analog band pass signal, which is preferably a modulated TV signal which can be displayed, received, and processed in a intermediate frequency position. The received band pass signal is converted via an analog/digital converter into a digital band pass signal and further converted for further processing into a corresponding digitally filtered and frequency adjusted condition. Several such types of prepared digital band pass signals are converted into the frequency in a manner such that they are coupled with one another in a frequency domain in an overlapping free manner and are combined into a frequency multiplex signal through digital addition. For a selected or predetermined receipt frequency, the middle frequency of the band pass signals must be set and maintained in a narrow tolerance range since the receipt frequency is chosen as the minimum reliable value in accordance with signal receipt theory. As a result, the processing rate in the digital frequency conversion apparatus is relatively low; in contrast, however, the total work in the realization of this processing rate is relatively high due to the small transfer region of the analog pre filter (especially an anti-alias filter) and the digital filter. In a further configuration of this processing rate as disclosed in German patent document DE 43 37 134 A1, a doubled sampling frequency is processed and this leads to the following advantages: —all of the filter demands are eliminated (analog and digital), -the neighboring channel selection (the immediately neighboring channel) does not need to be implemented via the tolerance restricted analog anti-alias filter but, rather, via a robust digital deep pass filter, —the band middle frequency of the band pass signal to be processed is the same as a standard intermediate frequency position such as, for example, a European norm with the image carrier of 38.9 Hz, and even cost favorable standard ZF filters can be used as the anti-alias filter in advance of the analog/digital conversion.

SUMMARY OF THE INVENTION

The present invention advantageously provides, in one aspect of the method thereof, the ability to use integral or identical digital signal preparation units of different transmission norms. The conformation to the respective standard can be substantially effectuated with software-namely, through the provision of different filter coefficients and mixing frequencies. Additionally, the method of the present invention avoids the need to provide a specific digital filter or frequency conversion apparatus for each television norm.

The method of the present invention also permits the use of simple digital filters with relatively high tolerance demands. In accordance with one aspect of the method of the present invention, a real value analog band pass signal is converted into a real digital band pass signal. A transfer of the signal into a complex signal, always in digital form, is eventually effectuated via the analog/digital conversion. Thus, the typical parallel processing and tolerance problems of analog processing rate of complex signals is basically avoided.

DESCRIPTION OF PREFERRED EMBODIMENTS

Figure 1:
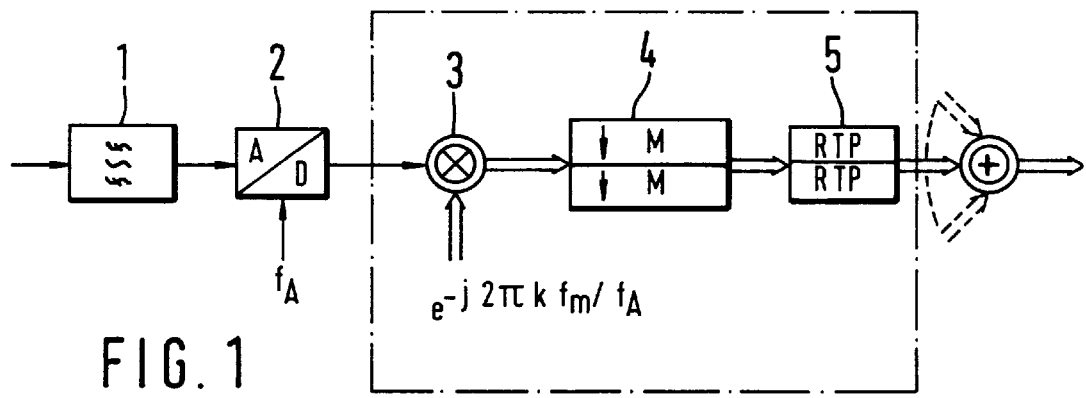
FIG. 1 is a schematic view of the steps of the signal preparation method of the present invention according to one aspect thereof.

FIG. 1 shows, in schematic manner, one aspect of the method of the present invention for preparing signals. An entry side TV norm ZF signal which may be, for example, in accordance with the European standard B (channel raster 7 MHz), image carrier of 38.9 MHz in standard sweep position, and sound carrier of 33.4 MHz or in accordance with US standard M, N (channel raster 6 MHz), image carrier at 45.75 MHz, sound carrier at 41.25 MHz, and ZF in sweep position, is conducted to an anti-alias filter 1. The anti-alias filter 1 operates to limit the delivered analog band pass signal in the standard ZF position with the normative utility band width in a manner such that, during a subsequent transfer scanning of signals, there will not be any spectral overlapping or overfolding with the utility signal spectrum or its reflection frequency. The analog band pass signal is received at a scanning frequency fA and is converted via an analog/digital converter 2 into a digital band pass signal. The signal sampling and the analog/digital conversion occurs, as seen in FIG. 1, in a single step. The following conditions are satisfied for the scanning frequency fA with respect to a given intermediate frequency fZF in this instance specifies the middle frequency of the spectrum of the input-side analog band pass signal:)

$$fZF \approx (m \pm \frac{1}{4})fA \tag{1}$$

and the useful spectral portion lies in the frequency range $$mfA/2, (m+1) \cdot fA/2) \tag{2}$$

whereby m is a whole number, especially a natural whole number. The digital band pass signal is ultimately converted to the frequency desired and digitally filtered. As seen in the one aspect of the method of the present invention shown in FIG. 1, an analog/digital converter 2 is connected to a digital mixer 3 by means of which the delivered band pass signal is mixed to the frequency f=0. A complex carrier oscillation exp(−j2/π k fm/fA) is used as a mixer signal, where fm in this instance specifies the middle frequency of the spectrum of the digitalized band pass signal, whereby fm≠fzF. A mixing with a mix frequency fm1 or fm2 occurs in correspondence with the delivered band pass signal (standard). The transmission of complex signals is representatively shown by the double line delineations in FIG. 1. Following a mixing with the complex oscillation a processing of the real and imaginary portions of the signal is performed separately in a decimation filter pair 4 as seen in FIG. 1. The decimation factor is shown with the designation M. A neighboring channel selection filtering is subsequently undertaken in a filtering unit 5, again in a manner in which the real and imaginary portions of the signal are separated. The remaining processing to create a digital frequency multiplex signal can be accomplished via a known processing approach such as is disclosed, for example, in German patent document DE 43 37 134 A1. The decimation filter pair 4 is preferably configured as a poly phase filter or as a cascade of poly phase filters, whose individual decimation factors as specified as products of the value of the total decimation factor M.

There exists globally a multitude of different television transmission norms by which also different intermediate frequencies ZF are utilized; for example, the image carrier for modulated TV signals for standard B in the standard sweep position lies at 38.9 MHz while those of the USA utilized standard M or, respectively, N are, in contrast, at 45.75 MHz. If one were to utilize for the standard M, for example, the process disclosed in German patent document DE 43 37 134 A1, with the herein disclosed sampling frequency of approximately 28 MHz (channel raster 7 MHz for standard B), the necessary condition (2) described hereinabove could not be respected for standard M. A solution for this problem would be to create, for each norm, a specific digital frequency converter which would require either the departing from each respective standard ZF position or a norm-specific sampling frequency. In contrast, the method of the present invention permits different standards such as, for example, standards B and M, to be utilized in processing of delivered ZF standard band pass signals without the need for hardware changes. All that is necessary is to set other mix frequencies fm1 or, respectively, fm2 and, if necessary, to provide filters with other filter coefficients. In order to process different standard band pass signals with a preparation apparatus, the entry sampling frequency fA must as a rule be higher to satisfy the conditions (1) and (2) described hereinabove, as compared to the process disclosed in German patent document DE 40 26 477 A1 or DE 43 37 134 A1. In the process disclosed in German patent document DE 43 37 134 A1, a signal sampling occurs at fA=28 MHz. For the various norms associated with the standards M and B, the sampling in accordance with the method of the present invention is performed constantly at fA=56 Mhz, regardless of the selected approach for further processing.

Figure 2:
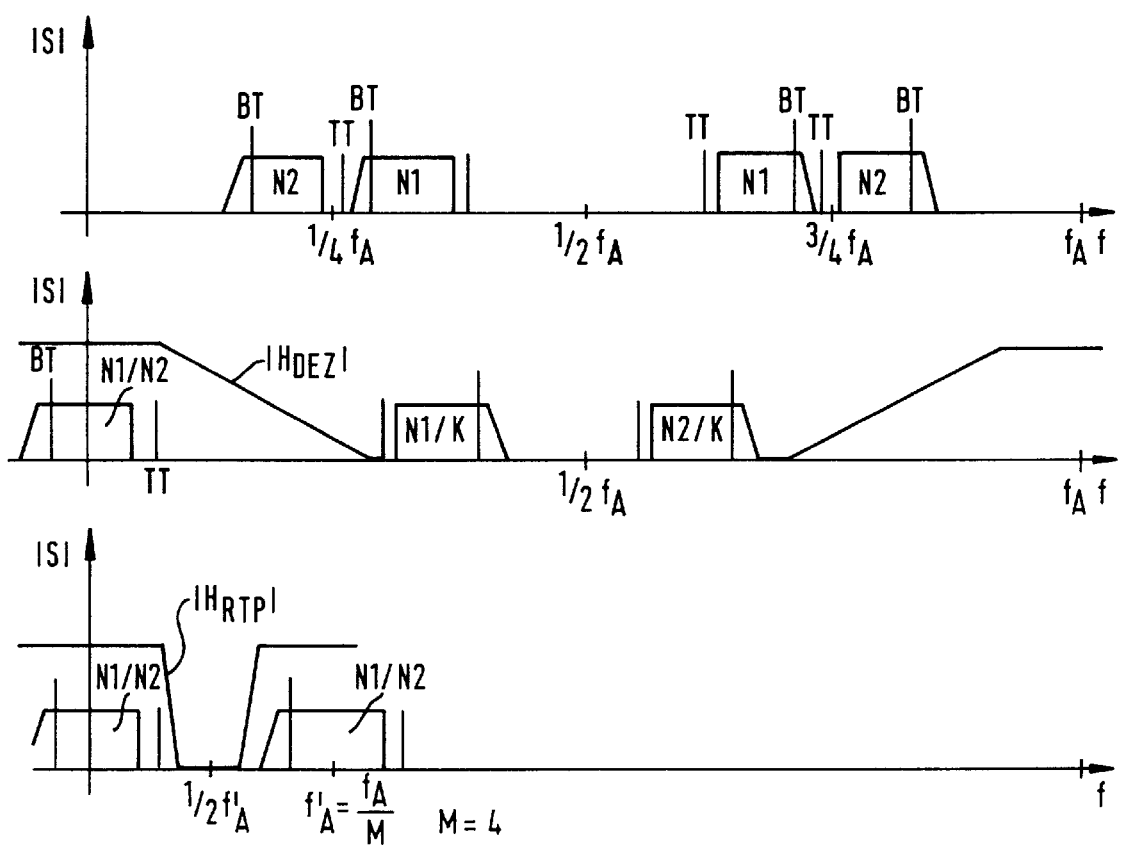
FIG. 2 is a graphical representation of the frequency spectrum of the signal preparation method shown in FIG. 1.

FIG. 2 graphically illustrates, in a plot as a function of the frequency spectrum [S], the processing for 2 TV standards with the arrangement as shown in FIG. 1 and, additionally, graphically illustrates the processing for the other aspects of the method of the present invention. It is to be understood that the arrangement shown in FIG. 1 is for processing only a single band pass signal. The utility signal spectrum of the various band pass signals in the intermediate frequency position are designated with the designations N1 and N2. The image carrier is designated with the designation BT and the sound carrier is designated with the designation TT. The first portion of FIG. 2 illustrates the utility spectrum after the sampling in the regulated positions with ¼ fA. At ¾ fA, the utility spectrum appears in the standard ZF position, namely, the sweep position. The second line shown in FIG. 2 shows the frequency displacement after the mixing of f=0 with the mix frequency fm1 or, respectively, fm2.

|HDEZ| specifies the frequency course of the decimation filter 4. The third line in FIG. 2 shows the utility spectrum after the filtering through the filter 5 and shows the frequency course |HRTP|. In order to be able to process different standard band pass signals with a universal digital frequency converter apparatus in accordance with the one aspect of the method shown in FIG. 1, the entry sampling frequency fA must, as a rule, be higher than the conventional values if the necessary conditions (1) and (2) described hereinabove are to be maintained. This implies, in accordance with one of the aspects of the method of the present invention, that for the European norm may be, for example, 28 MHz, and the European/US norms may be, for example, 56 Mhz, this value being valid for all aspects of the method of the present invention. In view of the commonly elevated entry sampling frequency, it is particularly advantageous if the sampling frequency is immediately reduced after the analog/digital conversion before the first processing step (paralleling of the signal processing), thereby to ensure that effective technology can be used with less lost performance. Such a configuration is illustrated in FIG. 3.

Figure 3:
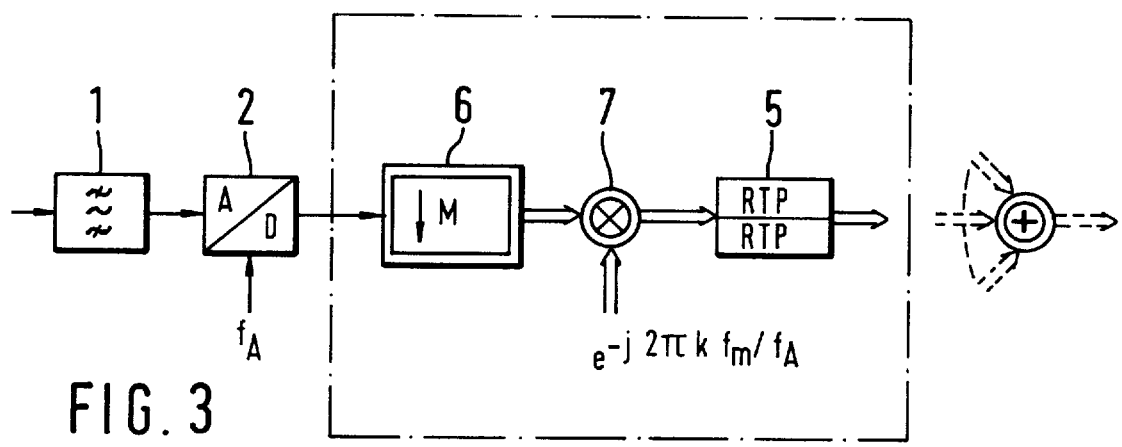
FIG. 3 is a schematic view of the steps of the signal preparation method of the present invention according to another aspect thereof comprising a transformation of the sampling rate before the mixing.

In another aspect of the method of the present invention shown in FIG. 3, the sampling frequency fA is reduced by the factor M preferably by means of a complex band filter 6 after conversion thereof by the analog/digital converter 2. In this configuration, a digital mixer 7 is provided having the complex carrier oscillation $\exp(-j\ 2\pi\ k\ fm/fA)$ as the mix frequency and this digital mixer handles signal immediately before the handling by the neighboring channel selection filter 5.

Another aspect of the method shown in FIG. 3 is characterized, and distinguished from the one aspect of the method shown in FIG. 1, by an exchange of the series of mix and decimation filtering which follows the analog/digital conversion. The frequency course |HDEZ| of the decimation filter 4 shown in the second line of FIG. 2 must be displaced to the desired utility spectrum norm position shown in the first line of FIG. 2. In this manner, there is provided a band pass filter CBF, designated with the designation 6 in FIG. 3, having complex coefficients (the double lining of the filter blocks symbolize the complex coefficients) and there is also provided, as shown by the double lines/arrows, complex signals which reduce the scanning frequency to the factor M. If the filter 6 is configured as a polyphase filter, then the reduction of the scanning frequency (parallelising) is accomplished after the analog/digital conversion before the first digital processing step. The complex coefficients of the band pass filter CBF can be obtained, for example, by modulating the impulse responses of a prototype filter (typically, a deep pass filter) by application of a complex carrier oscillation with the respective required (mix) frequency fm1 or, respectively, fm2. After the decimating complex band filtering by the band pass filter CBF, there follows, as seen in FIG. 1, a mixing or blending of the utility signal spectrum to the frequency 0 and, thereafter, the remaining processing is accomplished in a similar manner.

One can obtain a saving if a non-recursive FIR filter is used and the common filter with complex coefficients CBF is configured as a so-called M-tel band filter CMBF. In such a CMBF filter, many of the coefficients are equal to 0 (each Mth coefficient; the middle coefficient is 1/M). One can also so select the null phase of the modulated carrier oscillation that the real portion of the impulse response is symmetrical and its imaginary portion is non-symmetrical, whereby an efficient configuration can be achieved. Also, this configuration permits the delivery position to be fully realized since it is only necessary to load new filter coefficients for the processing of band pass signals according to another standard.

Figure 4:
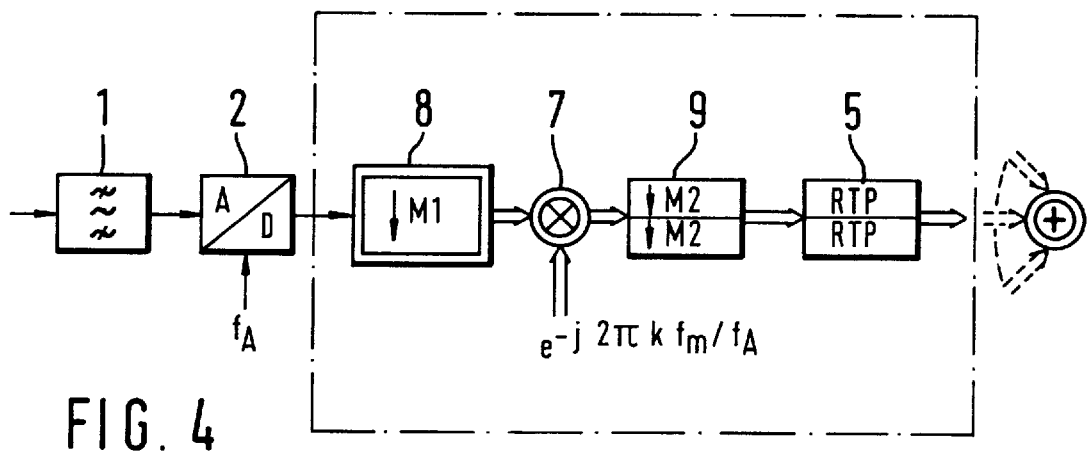
FIG. 4 is a schematic view of the steps of the signal preparation method of the present invention according to a further aspect thereof comprising splitting of the transformation of the scanning rate.

In the event of a relatively high entry sampling frequency or large decimation factor M, the filter grade of the complex band filter C(M)BF can be relatively large. In this event, it is advantageous to split the C(M)BF of the complex band filter 6 into a partial filter cascade. Such a configuration is shown in FIG. 4. The complex band filter 6 in FIG. 3 is split into at least two partial filter 8 and 9 with respective partial decimation factors M1 and M2 whereby the relationship (M1)·(M2)=M constantly obtains. The first partial filter 8 which is also a C(M)BF filter with complex coefficients is arranged before the mixer 7 and basically is not split into further partial filters. The second partial filter pair 9 for decimation of the complex signals by the factor M2 includes, as seen in FIG. 1, real coefficients and can as thus shown be split into partial filters with smaller decimation factors.

A particularly cost-favorable configuration is realized with M1=2 and M2=M/2 in connection with the configuration of the entry filter as an M-tel band filter C2BF. In this configuration, the prototype for the filter C2BF is a half-band filter in which every second coefficient up to the middle coefficient is omitted. The middle coefficient is ½. If it is possible to centralize the pass through band of the filter C2BF for all of the standard band pass signals to be processed with ±fA/4, then the filter C2BF can be configured as a CHBF filter with minimum effort, in accordance with the disclosure of European patent document EP 0 339 037 B1.

Figure 5:
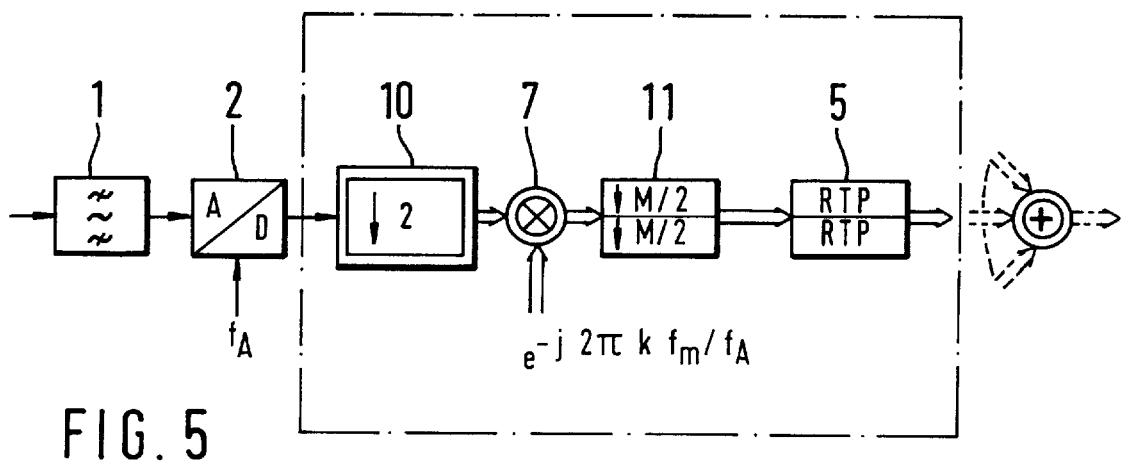
FIG. 5 is a schematic view of the steps of the signal preparation method of the present invention according to an additional aspect thereof comprising a complex offset half band filter and offset pass through domain.

The delivery position is fully optimized in this configuration, since the processing of the band pass signals in accordance with a different standard can be accomplished with only the necessity of selecting new filter coefficients and loading a different mix frequency fm. With the use of a CHBF it is even possible to provide all of the filters with the exception of the neighboring channel selection filter 5 (RTF) for all of the to be processed standard band pass signals with the same coefficients. If the various standard band pass signals to be processed, with maintaining the necessary conditions (1) and (2), are nonetheless located relatively wide from ±fA/4, it may be profitable (although requiring some minimal effort), in view of a small filter grade of the entry filter CHBP=C(M)BF in accordance with the configuration of the aspect shown in FIG. 4, to configure the filter of the configuration of FIG. 5 with a correspondingly efficient half band filter with complex coefficients and an offset through pass domain with:

$$fm=(2m+1)fA/8$$

whereby m=0,1,2,3, . . . as a complex offset-half band filter COHBF-filterblock 10-, in accordance with the disclosure of German patent document DE 196 277 87.6. This configuration serves to reduce the sampling frequency as in the configuration shown in FIG. 4 by M1=2. A further sampling frequency reduction can be realized with a mixing by means of the mixer 7 as seen in the configuration of FIG. 4 through the partial filter pair 9 for decimation by the factor M2=M/2.

It can also be advisable, in dependence on the spectral position of the band pass signals to be processed, to switch the filter function from the filter type CHBP to the filter type COHBF. In the event that the processing of the standard band pass signals is realized with minimal effort in the entry filter block according to the C(O)HBF structure, then a switching between these two filter types requires no modifications of the entry filter blocks. If the C(O)HBF hardware is configured as a common CBF structure, a reconfiguration in this entry filter block in accordance with the one aspect of the method shown in FIG. 1 can be accomplished entirely via software through modification of the one or several filter coefficient sets. This variation also fully utilizes the delivery position since the processing of band pass signals via a different standard merely requires the loading of new filter coefficients.

It is basically contemplated that the hereinbefore described variations of the filter for reducing the signal sampling rate or modifying the signal sampling rate can alternately be advantageously configured as non-recursive FIR filters. Further saving advantages can be achieved by the configuration of the FIR filter as a linear phase filter whereby the impulse response/coefficients are symmetrical.

The herein disclosed aspects of the method of the present invention refer exclusively to the collection of standard band pass signals into FDM signals via processing in a universal digital frequency converter which raises the scanning frequency to that value necessary for the FDM signal via neighboring channel selection filtering. If one refers to the rules of transposition according to the treatise "Multirate Digital Signal Processing" (Crochiere/Rabiner), Prentice Hall, 1983, see especially pages 68–70 with respect to the disclosed process for signal collection, one can obtain the transposable structures for splitting the FDM signals into individual (standard) band pass signals.

I claim:

1. Method for preparing analog band pass signals of the type received in an intermediate frequency position, comprising the steps of sampling an analog band pass signal with a sampling frequency fA; maintaining for the sampling frequency fA and a corresponding intermediate frequency fZF conditions: fZF≈(m±¼)fA; locating a utility spectrum portion in frequency range (m fA/2, (m+1)fA/2) whereby m is a whole number; and converting the sampled analog band pass signal into a digital band pass signal via an analog/digital convertion; correspondingly digitally filtering the digital band pass signal and digitally converting in a frequency for a further processing.

2. The method according to claim 1 and further comprising assembling a plurality of the thusly prepared digitally filtered band pass signals of same and/or different transmission norms into a common frequency multiplex signal with a use of similar preparation units which have different frequencies for a frequency multiplex formation and/or norm conversion and at least in case of different transmission norms are supplied with different filter coefficients.

3. The method according to claim 1 and further comprising converting the band pass signal into the complex signal subsequent to the analog/digital conversion.

4. The method according to claim 1 and further comprising mixing the utility signal spectrum to frequency 0 with a complex carrier frequency subsequent to the analog/digital conversion of the band pass signal and thereafter reducing a signal converting rate and a neighboring channel selection filtering.

5. The method according to claim 1 and further comprising reducing a signal sampling rate via a band pass filter with complex coefficients subsequent to the analog/digital conversion of the band pass signal; and thereafter mixing the utility signal spectrum to achieve a frequency 0, and a neighboring channel selection filtering.

6. The method according to claim 5 wherein the reducing the signal sampling rate includes reducing the signal sampling rate in two steps including a first sampling rate reducing before the mixing and a second sampling rate reducing after the mixing.

7. The method according to claim 6 wherein the first signal scanning rate reducing is performed with to its initial reduced value includes applying the factor 2; and the second signal scanning rate reducing is performed with the fact M/2.

8. The method according to claim 1 and further comprising filtering the digital band pass signal when it is relatively wide from ±fA/4, subsequent to the analog/digital conversion of the signal, with a half band filter having complex coefficients and an offset pass through domain: fm=(2m+1) fA/8 with m=0,1,2,3, . . . wherein fm specifies a middle frequency of the pass through domain.

9. The method according to claim 1 and further comprising selecting the sampling frequency fA for different transmission norms in accordance with TV standard B and M, to be approximately equal to 56 MHz.

10. The method according to claim 1 and further comprising reducing the signal sampling rate by means of at least one of a polyphase filter and a cascade of polyphase filters with individual decimation factors specified as a product of a value of a total decimation factor M.

11. The method according to claim 5 wherein the filter with complex coefficients is a non-recursive filter having each Mth coefficient identical to 0 and a middle coefficient equals 1/M.

12. The method according to claim 4 wherein a null phase of the modulated carrier frequency is selected such that a selected one of a real portion and an imaginary portion of the impulse response is symmetrical and the other portion is non symmetrical.

13. The method according to claim 6 wherein the reducing of the signal sampling rate includes processing the signal with a selected one of a band filter having complex coefficients and a complex M-tel band filter (CMBF) and the reducing the signal sampling rate to its subsequent value includes filtering the signal with a pair of partial filters having real coefficients for separate processing of real and imaginary portions of a mixed band pass signal.

14. The method according to claim 7 wherein the reducing the signal scanning rate to its initial reduced value includes centering a pass through band by means of a complex half band filter (CHBF) of an M-tel band filter (C2BF) operable to process all standard band pass signals within ±fA/4 in which every second coefficient is identical to 0 up to a middle coefficient.

15. The method according to claim 1 and further comprising reducing the signal receipt rate with non-recursive filters.

* * * * *